N. E. Hale.
Drawing and Evening.
No. 1,391. Reissued Feb. 3, 1863.
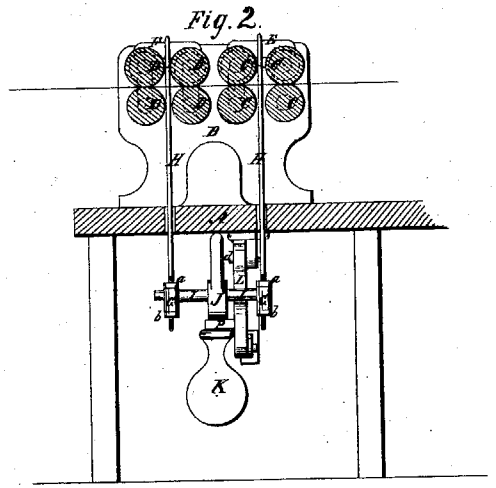
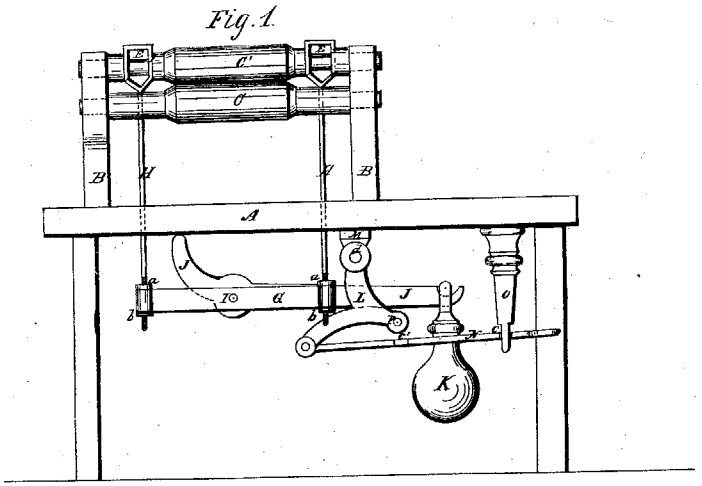
Witnesses,
A. W. Sawyer
Homer B. Dodge.
Inventor:
Noah E. Hale
N. PETERS, PHOTO-LITHOGRAPHER, WASHINGTON, D. C.

UNITED STATES PATENT OFFICE.

NOAH E. HALE, OF NASHUA, NEW HAMPSHIRE.

IMRROVEMENT IN APPLYING PRESSURE TO TOP ROLLERS OF DRAWING-MACHINES.

Specification forming part of Letters Patent No. 26,031, dated November 8, 1859; Reissue No. 1,391, dated February 3, 1863.

*To all whom it may concern:*

Be it known that I, NOAH E. HALE, of Nashua, in the county of Hillsborough and State of New Hampshire, have invented a new or improved method of applying pressure to the top rolls of drawing machinery employed in the manufacture of cotton or other fibrous material; and I do hereby declare that the following is a description of the same, reference being had to the accompanying drawings, forming part of this specification, in which—

Figure 1 is a front view of drawing-rollers with my invention applied. Fig. 2 is a transverse section of the same.

Similar letters of reference indicate corresponding parts in both figures.

To enable others skilled in the art to construct and use my invention, I will describe its construction and mode of operation.

My invention consists in a combination, substantially as hereinafter described, by which two or more top rollers may be weighted by the employment of a lever and weight, and a suitable mechanism by which the said weight may be raised and held upward, the whole being for the purpose or objects as hereinafter explained.

A represents the top piece of the frame, while B B are the standards erected thereon to contain or constitute the bearings for the front and back drawing-rollers, C C C′ C′ and D D D′ D′. E E and F F are saddles, such as are commonly employed, they resting as usual on the shafts of the top rolls, C′ C′ D′ D′—one being at each end of each of the front rolls, C′ C′, and one at each end of the back rolls, D′ D′. G G are two horizontal parallel bars—one being suspended from the two front saddles, E E, by two stirrup-rods, H H; the other by two similar rods, being also suspended from the two back saddles, F F. The said rods pass through slots or holes near the ends of said bars and are confined to the bars by nuts *a a b b*, which fit on screw-threads made on the rods and extend both above and below the bars. At the middle of the length of each of the parallel bars a hole is bored to receive one of two journals provided at the ends of a short shaft, I, which carries a lever, J, one end of which is so bent upward that its point or terminus may bear against the top piece, A. The lever, at its other end, has suspended from it a weight, K. This weight, by its action through the lever J, the bars G G, and stirrup-rods H H, will press downward the saddles at both ends of the rolls and serve to apply the necessary pressure to all the rolls. Should the said lever be placed midway between the two bars G G, the pressure of the weight K will be equalized upon the front and back rollers. It may, however, be so fitted to the shaft I as to be capable of being moved thereon either nearer to or farther from the front rolls, in order to give to them a greater or less proportion of the pressure of the weight, as may be desired.

Where there are two or more top rollers on one shaft or on two shafts having their axis in the same straight line, the pressure-saddle may be arranged between any two of the said rollers, instead of being placed at or near the end of the shaft, the said saddle being suitably connected with the bar G.

To provide not only for relieving the saddles from the pressure of the weight K, but to enable the top rolls to be taken out as occasion may require, I arrange by the side of the lever J a lever, L, whose fulcrum is a pin, *d*, supported by a small hanger, M, suspended below the top piece, A. To one arm of this lever I connect or joint a rod, N, having notches *c c′* to engage with a hanger, *o*. To the other arm of the said lever I attach a pin, P, which I extend underneath the lever J. When it may be desirable to have the weight operate on the saddles, the rod N is to be placed in such a position that its notch *c* may be in engagement with the hanger *o*, such being as shown in Fig. 1, but when it may be deemed advisable to relieve the saddles from the action of the weight the rod N should be drawn out until the notch *c* may be in engagement with the hanger. By this change of position of the rod the lever L will be moved in such manner as to cause the pin P to press upward the lever J at the weighted end thereof, and at the same time force the other end of such lever down out of contact with the top piece, A, and so as to relieve the bars G G and stirrup-rods H H from the action of the weight, in order to permit the saddles to be removed from the stirrups at the upper ends of the rods H H and the top rolls to be removed from their places, if desirable.

The lever J and its appendages, consisting of the lever L and notched rod, might be applied in the manner I have described in combination with but one of the bars G G, but in that case the front and back rollers will require to be weighted separately. The one weight in the latter case, however, operates on both ends of its respective roll, as in the first-described method of applying the lever J.

I do not claim, broadly, the adjustment of drawing-rollers by weights, nor the release of the rolls from the action of the weight by simply lifting the latter; nor do I claim any part or feature of the device represented in the patent of S. P. Spencer, dated June 29, 1858; but, Having described my invention, I claim—

My improved combination or mechanism for applying pressure to and relieving from it the top rollers of one or more sets of drawing-rollers, the said mechanism consisting of one or more bars, G, the lever J, the weight K, the lifting-lever L, the notched bar N, and hanger O, or their mechanical equivalent or equivalents, the whole being applied to the said top rollers, substantially in manner and so as to operate therewith as described.

NOAH E. HALE.

Witnesses:

A. W. SAWYER,

ABNER B. DODGE.